3,468,935
PREPARATION OF ORGANOPHOSPHONIC ACIDS
Dennis Raymond Peck, Quinton, England, assignor to Albright & Wilson (Mfg.) Limited, Oldbury, near Birmingham, Warwickshire, England, a British company
No Drawing. Filed Oct. 27, 1965, Ser. No. 505,410
Claims priority, application Great Britain, Nov. 11, 1964, 45,991/64; Aug. 9, 1965, 33,939/65
Int. Cl. C07f 9/38
U.S. Cl. 260—488
7 Claims

ABSTRACT OF THE DISCLOSURE

Acetoxyethylidenediphosphonic acid having the formula: $CH_3CO[CH_3CO(PO_3)_2H_4]$, is prepared by reacting glacial acetic acid with a phosphorus trihalide. The molar ratio of reactant acetic acid per mole of reactant phosphorus trihalide is at least 3.5:1, and preferably 4–10:1, with optimum results obtained with a molar ratio of at least 5:1. The product acetoxyethylidenediphosphonic acid may be recovered as such, or by contact with water converted into 1-hydroxyethylidenediphosphonic acid. Alternatively, treatment of the acetoxyethylidenediphosphonic acid containing reaction mixture with an aqueous base results in the preparation of salts of 1-hydroxyethylidenediphosphonic acid.

The present invention relates to improvements in the preparation of certain organophosphonic acids and their salts. The invention is applicable to the preparation of mixtures comprising at least some acids having the formulae:

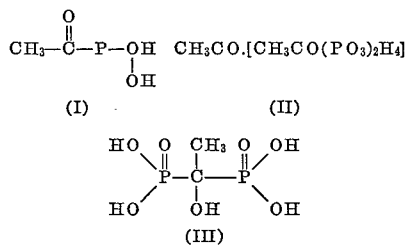

and salts of such acids. The acids are referred to herein as acetyl phosphonic acid (I), acetoxy ethylidenediphosphonic acid (empirical formula, II), 1-hydroxyethylidenediphosphonic acid (III). The invention is of particular value in relation to the commercial preparation of 1-hydroxyethylidenediphosphonic acid.

During the last 70 years the reaction products of acetic acid (or its derivatives) with phosphorus trichloride or phosphorous acid have been investigated by various workers. These products have been shown to possess a variety of useful properties. In particular they have been advocated for use as surface-active agents and chelating agents. For this reason many attempts have been made to find an acceptable economic method of preparing them commercially.

Salts of the acid (III) were first prepared by Baeyer and Hoffman in 1897 by reacting 2.8 moles of glacial acetic acid with phosphorus trichloride at room temperature for 24 hours, heating to 120° C. and then treating the product with aqueous alkali to form crystalline salts (see Berichte, vol. 30, p. 1973). This process has not been found applicable to the commercial manufacture of 1-hydroxyethylidenediphosphonic acid since it is not readily controlled to give high or consistent yields. In view of the difficulties experienced in controlling the reaction of acetic acid and phosphorus trichloride, recent attempts to prepare this and related phosphonic acids have largely concentrated on reaction of acetyl chlorides and/or anhydrides with phosphorous acid. These reagents are expensive, and the high cost of producing organophosphonic acids from phosphorous acid has been a principal objection to their commercial acceptance in many branches of industry.

We have now discovered a method of preparing organophosphonic acids from acetic acid and a phosphorus trihalide such as phosphorus trichloride, which enables the acids and, in certain cases, their salts to be obtained in high and consistent yields at a lower cost than hitherto.

Previously reported reactions of acetic acid and phosphorus trichloride have invariably employed up to three molar proportions of the acids. We have discovered that when more than 3.5 moles of acid are employed per mole of phosphorus trihalide, the nature of the reaction appears to undergo a significant and unexpected change, resulting in improved yields of the product. This change is most readily observed when the reaction is performed at a temperature above 60° C. and preferably above 110° C. At these temperatures, the product undergoes some separation into two layers. Hitherto, in processes employing up to three moles of acid the separation has not been significant, and we have shown that the top layer in such instances usually contains about 60% of the phosphorus content of the reaction mixture. We have discovered that, when more than 3.5 moles of acid are employed, the separation into two layers becomes sharper and substantially all the phosphorus is then found in the viscous bottom layer. This change is accompanied by a sharp increase in the yields of phosphonic acid which may be recovered. For example, using four or more molar proportions of glacial acetic acid and phosphorus trichloride at 110° C., we have obtained two readily separable layers, the upper consisting principally of acetyl chloride, acetic anhydride and acetic acid and containing less than 5% of the phosphorus, and less than 2% if 5 or 6 molar proportions are employed. The lower layer consists of a viscous phosphonic acid product which comprises an uncharacterised phosphonic acid, and acetoxy ethylidenediphosphonic acid (II). This latter product can be isolated as a pure crystalline solid, which is readily hydrolysed by contacting it with water, thereby forming 1-hydroxyethylidenediphosphonic acid. The hydrolysis proceeds slowly at room temperature and more rapidly at 100–120° C. Thus if more than 3.5 moles of acetic acid is contacted with one mole of phosphorus trichloride, heated slowly to 110° C., and the product subjected to steam stripping, substantially pure 1-hydroxyethylidenediphosphonic acid is obtained in yields which may be in excess of 95%. The acetic acid which distills over may be obtained in a concentrated form suitable for re-use, and the process provides a cheap and convenient method of manufacturing 1-hydroxyethylidenediphosphonic acid (III).

We have also discovered that if the reaction of the acetic acid and phosphorus trichloride is performed at temperatures below 50° C., a white precipitate of uncertain composition is formed. On recrystallising this precipitate from glacial acetic acid we have obtained substantially pure acetoxyethylidenediphosphonic acid (II).

The acetoxy ethylidenediphosphonic acid is readily prepared by heating an initial reaction mixture containing at least 3.5 molar proportions of acetic acid to one of $PCl_3$ above 60° C. and preferably about 100° C. at these temperatures the mixture separates into two layers, substantially all the phosphorus appearing in the lower viscous layer. This lower layer is apparently composed chiefly of acetoxyethylidenedisphonic acid together with a smaller proportion of a second phosphonic acid of unknown composition, the two layers may be readily separated. The lower layer is dissolved in hot glacial acetic acid and cooled slowly, the pure acetoxyethylidenediphosphonic acid crystallises after about 24 hours. Water, preferably at about 60° C to 120° C., converts the lower layer into 1 - hydroxyethylidenediphosphonic acid and acetic acid. The 1-hydroxyethylidenediphosphonic acid can be obtained pure from these hydrolysis products by heating to 110°–120° C. and allowing the volatile impurities to distill off. The pure 1-hydroxyethylidenediphosphonic acid then crystallises on cooling. Alternatively salts of 1-hydroxyethylidenediphosphonic acid may be prepared by treating the lower layer with hot aqueous alkali, or an aqueous suspension of a suitable base, and cooling the resulting solution until the salt crystallises.

Our invention thus resides principally in the discovery that the reaction of more than 3.5 moles of acetic acid with a phosphorus trihalide results in the formation of a product containing an organic phosphonic acid, from which, by using an appropriate working up technique, one or more of the acids (I), (II) or (III) or their salts may be recovered in greater yields than those hitherto obtained from the same reagents but employing only 3 or less molar proportions of the acid.

Our invention therefore provides an improvement in the process for preparing organophosphonic acids and salts thereof, wherein acetic acid is reacted with a phosphorus trihalide $PX_3$ where X represents halogen, which improvement consists in employing at least 3.5 molar proportions of acetic acid per mole of phosphorus trihalide.

According to a preferred embodiment, our invention provides a process for preparing 1-hydroxyethylidenediphosphonic acid of the formula

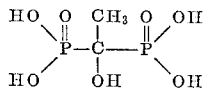

which comprises contacting at least 3.5 molar proportions of acetic acid with one molar proportion of a phosphorus trihalide, and thereafter contacting the reaction mixture with water, preferably by a steam stripping technique.

An alternative embodiment of the invention provides a process for preparing acetoxyethylidenediphosphonic acid, which comprises contacting at least 3.5 molar proportions of acetic acid with one molar proportion of a phosphorus trihalide, at a temperature of at least 80° C. to form a product having an upper and lower layer, separating the lower layer, dissolving the lower layer in glacial acetic acid at an elevated temperature, cooling the solution, allowing the cooled solution to stand until the acetoxyethylidenediphosphonic acid crystallises and separating the crystals so formed.

A further embodiment of the invention provides a method for preparing salts of an acid of the formula

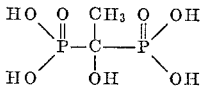

where at least one of the hydrogen atoms in a POH grouping has been replaced by ammonium or metal, which method comprises contacting at least 3.5 molar proportions of acetic acid with a phosphorus trihalide, preferably about 100° C., contacting the product with an aqueous solution or suspension of a base, and separating the salt by crystallisation or precipitation.

The preferred proportions of acetic acid to phosphorus trihalide for use according to our invention are between 4:1 and 10:1. Especially good results are obtained in the range 5:1 to 6:1. It is preferred to employ substantially anhydrous acetic acid in the present invention, however acetic acid mixed with a minor proportion of water up to about 5% by weight of acid may be employed without impairing the yield. Proportions of water greater than about 10% are not usually employed. Alternatively the acetic acid may be employed in admixture with a minor proportion of its anhydride, provided that the acid is present in a proportion of at least 3.5 moles per mole of phosphorus halide. The preferred phosphorus trihalide is phosphorus trichloride.

In order to avoid excessive loss of acetyl halide during the initial stages of the reaction, it is preferred to add the phosphorus trihalide slowly to the cold acid, and then heat the mixture gently to 50° C. and then to a temperature above 80° C. and preferably between 100 and 120° C. The mixture separates into two layers, which may, if desired be separated, the upper layer being mixed with water to regenerate the acetic acid in a form suitable for re-use while the lower layer is retained as a source of acetoxyethylidenediphosphonic acid, or contacted with water or aqueous alkali to form 1-hydroxyethylidenediphosphonic acid or its salts. For greater simplicity the water treatment may be carried out on the total reaction mixture.

If 1-hydroxyethylidenediphosphonic acids is required, the preferred process comprises adding phosphorus trichloride slowly to at least 3.5, and preferably from 5 to 6, molar proportions of glacial acetic acid, raising the temperature above 100° C. and preferably between 110 and 120° C. and absorbing the HCl evolved with alkali. After two hours heating, steam is passed into the total mixture. It is desirable to complete the process by heating to a temperature of from 130 to 160° C. to drive off residual water and acetic acid. Prolonged heating above 150° C. causes charring and should be avoided. On cooling, the 1 - hydroxyehylidenediphosphonic acid usually crystallises from the non-volatile portion and may be separated and purified by normal methods.

Salts of 1-hydroxyethylidenediphosphonic acid may be prepared by separating and neutralising the lower layer, preferably after suitable purification, by addition of aqueous solutions or suspensions of bases. It is preferred to purify the lower layer by treatment with steam or water and to heat until all volatile products are removed e.g. at temperatures up to 140° C. However, steam-, vacuum- or ordinary distillation procedures may also be used.

Alkali metal salts are formed by reacting the purified lower layer with the appropriate amount of an aqueous alkali hydroxide solution, preferably of such a concentration that the required salt will crystallise on cooling. Alternatively the resulting solution may be evaporated to dryness by any known suitable means, or the salt may be precipitated by the addition of a water soluble organic solvent e.g., an alcohol, in which the salt is insoluble.

Water-insoluble diphosphonate salts of the alkaline earth and heavy metals have been obtained by reacting the lower layer, preferably after treatment with steam or water, with aqueous solutions of a soluble salt of the metal. It is preferable, but not necessary, to dilute the lower layer with water before treating it with the said metal salt solution. Where the diphosphonate salt is appreciably soluble in dilute acid solutions, the product yield is considerably increased by neutralising or partly neutralising the lower layer with an alkali metal base before adding the solution of alkaline earth or heavy metal salt.

The acetoxyethylidenediphosphonic acid is a new compound characterised by the empirical formula $$CH_3CO[CH_3CO(PO_3)_2H_4]$$

and the conversion by water to 1-hydroxyethylidenediphosphonic acid. The NMR spectrum suggest that it has the structure

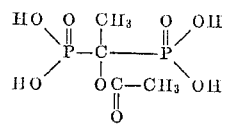

The invention is illustrated by the following examples.

Example 1

68.8 gms. (0.5 mol) of phosphorus trichloride were added over a period of 5–10 minutes to 180 gm. (3 mols) of glacial acetic acid, initially at room temperature. The mixture was stirred for about 30 minutes, during which time the temperature dropped by about 5° C.

The reaction mixture was then heated gently under reflux until the liquid temperature reached 60° C. The hydrogen chloride was removed by absorption in alkali. Heating was continued for up to 2 hours until the temperature of the lower layer was about 110° C. When all the hydrogen chloride had been removed an tests indicated that the upper layer contained less than 2% of the original phosphorus, the mixture was separated. The upper layer was re-used, after suitable purification, for a further preparation.

The lower layer was heated to 120° C. and steam was blown in for 1–1½ hours and the acetic acid formed was recovered. The mixture was then heated to a temperature of 130°–140° C., cooled and allowed to crystallise. The product was purified by re-crystallisation from glacial acetic acid. The purified mono-hydrate had the following analysis:

Found, percent: C, 10.80; H, 4.22; P, 27.50; O (by difference), 57.5. Theory, percent: C, 10.70; H, 4.46; P, 27.7; O (by difference) 57.1.

The yield of product was 54 gms. or 96.4% based on phosphorus trichloride.

The effect of varying the acetic acid/$PCl_3$ ratio is illustrated by the following examples, in which 2 and 3 are comparative examples using less than 3.5 molar proportions of acid to phosphorus trihalide.

Example 2 (1:1 molar proportions)

30 gms. (0.5 mol) of acetic acid and 69 gms. (0.5 mol) of phosphorus trichloride were reacted in the manner described in Example 1. A top layer comprising 85% of the weight of the reaction mixture was obtained and in this there was 0.31 mol of phosphorus or 60% of that taken originally. The bottom layer contained 40% of the phosphorus. Treatment of this with steam at 120°–140° C. produced only 0.054 mol of aceto-diphosphonic acid, giving a yield of 11%.

Example 3 (2:1 molar proportions)

The reaction was carried out as described in Example 1, except that 1.0 mol of acetic acid and 0.5 mol of phosphorus trichloride were used, to give an upper layer comprising 45% of the weight of the reaction mixture. This contained 0.07 mol or 14% of the phosphorus. The bottom layer contained 85% of the phosphorus from which 0.125 mol of aceto-diphosphonic acid was obtained giving a yield of 25%.

Example 4 (4:1 molar proportions)

When 2.0 mols of acetic acid and 0.5 mol of phosphorus trichloride were used a top layer of 55%, containing 0.01 mol of phosphorus was obtained. The bottom layer contained 96% of the phosphorus and 0.21 mol was present as aceto diphosphonic acid, giving a yield of 42%.

Example 5 (6:1 molar proportions)

A mixture of 3.0 mols of acetic acid and 0.5 mol of phosphorus trichloride treated according to Example 1, gave an upper layer of 67% in which there was 0.008 mol of phosphorus. 98% of the phosphorus was found in the lower layer, from which 0.48 mol of aceto diphosphonic acid was obtained. This is a yield of 96%.

Example 6 (8:1 molar proportions)

4 mols of acetic acid was 0.5 mol of phosphorus trichloride gave a top layer of 75% containing 0.015 mol of phosphorus. From the bottom layer, which contained 96% of the phosphorus there was obtained 0.47 mol of aceto-diphosphonic acid, or a yield of 94%.

The following examples illustrate the preparation of salts of 1-hydroxyethylidenediphosphonic acid.

Example 7

6 mols of acetic acid and 1 mol of phosphorus trichloride were reacted as described in Example 1, the lower layer was separated and treated for 1½ hours with steam at 120°–130° C. It was then neutralised by adding 1 mol of sodium hydroxide as a 30% aqueous solution. On cooling to 20° C., a crystalline product having the composition $Na_2C_2H_6P_2O_7.4H_2O$ was obtained. The yield, allowing for the material remaining dissolved in the mother-liquor was 92%, based on the phosphorus originally taken.

Example 8

A lower layer obtained as described in Example 7 was neutralised by adding approximately 1½ mols. of a 30% aqueous sodium hydroxide solution. The exact amount was determined by adding alkali until the pH of a 1% solution was 9.0. An equal volume of alcohol was then added to the mixture when the temperature was below about 55° C. On filtering and drying in air, the product had a composition corresponding to $Na_3C_2H_5P_2O_7.6H_2O$.

Example 9

Using the procedure of Example 8, but adding 2 mols. of sodium hydroxide until the pH of a 1% solution was 12.0, an oil was obtained which slowly crystallised. The analysis of the product corresponded to $Na_4C_2H_4P_2O_7$ with approximately six molecules of water of crystallisation.

Example 10

The purified lower layer obtained as described in Example 1, was neutralised by the careful addition of 0.25 mol of rubidium carbonate as a 25% aqueous solution. On cooling to 20° C., a crystalline product of the composition $RbC_2H_7P_2O_7.2H_2O$ was obtained.

Example 11

A purified lower layer prepared according to Example 7 was reacted with a 10% excess over the amount of 20% ammonium hydroxide solution required to form the di-ammonium salt. Addition of acetone gave an oil which was separated and dried at 50°–60° C. This gave a product of the composition $(NH_4)_2C_2H_6P_2O_7$.

Example 12

The lower layer resulting from the reaction of 1 mole of phosphorus trichloride and 6 mols. of acetic acid, after treatment with steam at 120°–130° C., was diluted with an equal volume of water and cooled to room temperature. 1.0 mol. of silver nitrate as a 20% aqueous solution was then added and the precipitate filtered off and dried. The composition of the product was $$Ag_2C_2H_6P_2O_7$$

Example 13

An aqueous diphosphonic acid solution obtained as in the previous example was partly neutralised by adding 0.8 mol. of aqueous caustic soda. To the resulting mixture 1 mol. of calcium nitrate as a 20% solution was added. The composition of the precipitate after drying at 110° C. was $CaC_2H_6P_2O_7.3H_2O$.

Example 14

A solution of diphosphonic acid prepared from 1 mol. of phosphorus trichloride and 6 mols. of acetic acid was neutralised with a molar proportion of caustic soda on a phosphorus basis, and the resulting solution was heated. It was then mixed with a molar proportion of dilute cobaltous chloride solution and allowed to crystallise while cooling. A small proportion of ethyl alcohol was added to the solution at 50°–60° C. in order to increase the crystallisation. The product had the composition $$CoC_2H_6P_2O_7.6H_2O$$

I claim:
1. The process for preparing acetoxyethylidenediphosphonic acid comprising reacting glacial acetic acid with phosphorus trichloride, in an amount of between 3.5 and 10 molar proportions of glacial acetic acid per mole of phosphorus trichloride, at a temperature below about 50° C. to form a white precipitate containing acetoxyethylidenediphosphonic acid.

2. The process for preparing acetoxyethylidenediphosphonic acid comprising reacting glacial acetic acid with phosphorus trihalide at a temperature above about 80° C., in an amount of between 3.5 and 10 molar proportions of glacial acetic acid per mole of phosphorus trihalide.

3. The process of claim 2 wherein said acetic acid is reacted with phosphorus trichloride in a molar ratio of between about 5:1 and 6:1 and wherein the product from said reaction of glacial acetic acid with phosphorus trichloride is separated into two layers, glacial acetic acid is added to the lower of said two layers, and acetoxyethylidenediphosphonic acid is then crystallized from said glacial acetic acid.

4. The process for preparing 1-hydroxyethylidenediphosphonic acid comprising reacting glacial acetic acid with phosphorus trichloride in an amount of between 4 and 10 molar proportions of glacial acetic acid per mole of phosphoric trichloride at a temperature below 50° C. to produce acetoxyethylidenediphosphonic acid, and then contacting said acetoxyethylidenediphosphonic acid with water to produce 1-hydroxyethylidenediphosphonic acid.

5. The process of claim 4 wherein said acetic acid is reacted with phosphorus trichloride in a molar ratio of between about 5:1 and 6:1, and wherein 1-hydroxyethylidenediphosphonic acid is recovered by steam dripping said product at a temperature between about 100° C. and 120° C.

6. The process for preparing 1-hydroxyethylidenediphosphonic acid from acetoxyethylidenediphosphonic acid comprising reacting glacial acetic acid with phosphorus trichloride in a molar ratio of between about 5:1 and 6:1 at a temperature above about 80° C. and contacting the product of said reaction of glacial acetic acid and phosphorus trichloride with water.

7. The process according to claim 1 wherein said molar ratio is of between about 5:1 and 6:1.

References Cited

UNITED STATES PATENTS 3,366,671  1/1968  Quimby _____ 260—502.4

FOREIGN PATENTS 1,327,618  4/1963  France.
1,148,235  5/1963  Germany.
  889,670  2/1962  Great Britain.

OTHER REFERENCES

Baeyer et al.: Berichte, vol. 30, pp. 1973–1978 (1879).

LORRAINE A. WEINBERGER, Primary Examiner

V. GARNER, Assistant Examiner

U.S. Cl. X.R.

252—351; 260—430, 439, 502.5

UNITED STATES PATENT OFFICE
CERTIFICATE OF CORRECTION

Patent No. 3,468,935  Dated September 23, 1969

Inventor(s) DENNIS RAYMOND PECK

It is certified that error appears in the above-identified patent and that said Letters Patent are hereby corrected as shown below:

Column 1, lines 34-37, the left hand formula (I) should appear as follows:

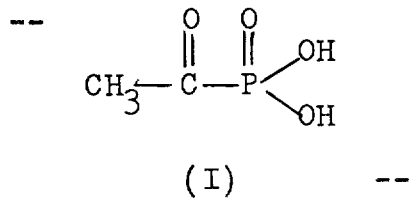

(I)

Column 8, line 1, the portion of the word "drip-" should read -- strip- --.

SIGNED AND SEALED
JAN 20 1970

(SEAL)
Attest:

Edward M. Fletcher, Jr.
Attesting Officer

WILLIAM E. SCHUYLER, JR.
Commissioner of Patents